United States Patent [19]

Tsutsumi et al.

[11] Patent Number: 5,617,085
[45] Date of Patent: Apr. 1, 1997

[54] METHOD AND APPARATUS FOR MONITORING THE SURROUNDINGS OF A VEHICLE AND FOR DETECTING FAILURE OF THE MONITORING APPARATUS

[75] Inventors: Kazumichi Tsutsumi; Shigekazu Okamura; Tatsuji Irie, all of Tokyo, Japan

[73] Assignee: Mitsubishi Denki Kabushiki Kaisha, Tokyo, Japan

[21] Appl. No.: 652,683

[22] Filed: May 30, 1996

[30] Foreign Application Priority Data

Nov. 17, 1995 [JP] Japan ..................... 7-300214

[51] Int. Cl.⁶ ..................... G08G 1/16
[52] U.S. Cl. ..................... 340/903; 340/901; 340/435; 348/169; 180/167; 382/107
[58] Field of Search ..................... 340/903, 901, 340/435; 348/169; 180/167, 169, 271; 382/107; 356/375

[56] References Cited

U.S. PATENT DOCUMENTS

| | | | |
|---|---|---|---|
| 5,161,632 | 11/1992 | Asayama | 340/435 |
| 5,177,462 | 1/1993 | Kajiwara | 340/903 |
| 5,214,408 | 5/1993 | Asayama | 340/901 |
| 5,216,408 | 6/1993 | Shirakawa | 340/435 |
| 5,304,980 | 4/1994 | Maekawa | 340/903 |
| 5,309,137 | 5/1994 | Kajiwara | 340/903 |
| 5,461,357 | 10/1995 | Yoshioka et al. | 340/903 |

FOREIGN PATENT DOCUMENTS

| | | |
|---|---|---|
| 55-96475 | 7/1980 | Japan . |
| 5113482 | 5/1993 | Japan . |

*Primary Examiner*—Jeffery Hofsass
*Assistant Examiner*—John A. Tweel, Jr.
*Attorney, Agent, or Firm*—Sughrue, Mion, Zinn, Macpeak & Seas

[57] ABSTRACT

A camera and a beam-scan type laser radar whose optical axes are coincident are mounted on a vehicle. A lane detector detects the vehicle's own lane on a display image by processing an image picked up by the camera. A coordinate transforming device transforms the coordinates of positional information of an object, most likely a vehicle, detected by the laser radar in conformity with coordinates on the image of the camera. Another detector compares a position of the vehicle's own lane with a position of the detected object, judges whether or not the detected object is within the vehicle's own lane, and separates the detected object within the vehicle's own lane from objects detected outside the vehicle's own lane. A failure detection method and a corresponding apparatus are provided to determine whether the optical axes of the camera and the laser radar are coincident.

11 Claims, 8 Drawing Sheets

FIG.4 (a)
R-Q COORDINATES

FIG.4 (b)
H-V COODINATES

FIG.4 (c)
X-Y COORDINATES

METHOD AND APPARATUS FOR MONITORING THE SURROUNDINGS OF A VEHICLE AND FOR DETECTING FAILURE OF THE MONITORING APPARATUS

BACKGROUND OF THE INVENTION

1. Field of the Invention

The present invention relates to a method for monitoring the surroundings of a running vehicle and a vehicle-mounted apparatus for carrying out the method, including a camera and a laser radar for detection of vehicles on the road and in the lane of the vehicle. The present invention also relates to a method for judging failure of the monitoring apparatus by detection of coincidence between the optical axes of the camera and the laser radar.

The instant application is based on Japanese Patent Application No. HEI 7-300214, filed Nov. 17, 1995, which is incorporated herein by reference for all purposes.

2. Brief Description of Related Art

As one of the conventional apparatuses of this type, Japanese Laid-Open Patent Publication (unexamined) No. 113482/1993 discloses a vehicle-mounted rear-end collision preventing apparatus. In this conventional apparatus, a laser radar of a single beam type, from which a laser beam is emitted in one direction in a defined narrow range ahead of a vehicle, is associated with an image processing means, whereby an obstacle ahead in the vehicle's own traffic lane is detected.

An object of this conventional apparatus is to detect an obstacle in the vehicle's own lane. However, if the road is curved ahead of the vehicle, the laser beam emitted from the vehicle's laser radar does not irradiate the vehicle's own lane, but irradiates an adjacent lane on either the left or the right side of the vehicle.

Accordingly, in case of a curved road, any obstacle ahead of the vehicle detected by the laser radar is not necessarily in the vehicle's own lane.

In view of the foregoing situation, in this conventional apparatus, first, an image ahead of a vehicle picked up by a camera is processed to detect the vehicle's own lane, and then the curvature ahead of the vehicle's own lane is detected. Then, direction of beam irradiation from the laser radar is adjusted in conformity with the curvature, whereby the laser beam correctly irradiates the vehicle's own lane at all times even though the road is curved ahead of the vehicle.

However, only a laser radar of single beam type for emitting a laser beam in one direction in a defined narrow range is described in the mentioned conventional art.

For the purpose of monitoring the surroundings of a running vehicle over a wider range, several systems for causing a laser beam to scan a wider range in the horizontal direction have been heretofore proposed.

For example, Japanese Patent Publication (examined) No.6349/1986 discloses a vehicle-mounted obstacle detecting apparatus. In this apparatus, a laser beam emitted in the running direction of a vehicle performs a two-dimensional scan, and reflected light from an obstacle is measured, whereby distance to the obstacle and the position thereof in the leftward or rightward direction are detected.

In the apparatus as disclosed in this Japanese patent publication, since it is intended to monitor not only the vehicle's own lane but also adjacent lanes over a wide range, it is possible to detect not only any obstacle in the vehicle's adjacent lanes but also any obstacle in other lanes further away from the vehicle.

In such a detection system there still remains the following problem. In a laser radar of the beam-scan type, since not only other vehicles running ahead in the vehicle's own lane but also other vehicles running in other lanes, including adjacent lanes, may be detected, it is absolutely essential to identify which of these vehicles represents an actual obstruction.

If the road is straight any other vehicle in the vehicle's own lane is running in front of the vehicle at all times. In this case, identification of another vehicle running ahead in the vehicle's own lane is very easy.

However, in reality no road is straight everywhere. On an ordinary road, another vehicle running ahead in a vehicle's own lane is not always in front of the vehicle. For example, where the road is curved rightward ahead of the vehicle, the other vehicle running ahead in the vehicle's own lane is on the right side of the vehicle.

On the other hand, where the road is curved leftward ahead of the vehicle, the other vehicle running ahead in the vehicle's own lane is on left side of the vehicle.

Moreover, depending upon the type of curve, there may be a case where another vehicle running in an adjacent lane is actually in front of the equipped vehicle.

Accordingly, with respect to a beam-scan type laser radar, it is certain that obstacles may be detected over a wider range, but it is difficult to judge what is a true obstacle in the vehicle's own lane.

Japanese Laid-Open Patent Publication (unexamined) No. 113482/1993 discloses a vehicle-mounted rear-end collision preventing apparatus in which the irradiation range of the laser beam is fixed. This allows for any obstacle ahead in the vehicle's own lane to be identified within a fixed range. In this apparatus, however, only an obstacle in the vehicle's own lane can be detected. Thus, the capability of the beam-scan type laser beam to monitor a wide range is not sufficiently utilized.

SUMMARY OF THE INVENTION

It is, therefore, an object of the present invention to provide a surroundings monitoring method for monitoring the surroundings of a vehicle which is capable of identifying a detected object lying or running in a vehicle's own lane even when employing a laser radar of the beam-scan type, and a surroundings monitoring apparatus to carry out this method.

It is a further object of the invention to provide a failure judgment method for judging a failure of the mentioned surroundings monitoring apparatus. This failure judgement method uses the lack of coincidence of the optical axes of a laser radar beam, which is used to detect another vehicle, and a camera, which is used to detect the lane, in order to determine when a failure has occurred.

The surroundings monitoring method for monitoring the surroundings of a vehicle in accordance with the present invention comprises the steps of: (1) detecting image signals of a lane in which the vehicle is located with a camera mounted on the vehicle; (2) determining coordinates of the lane on a display image by processing the image signals; (3) detecting an object ahead of the vehicle with a beam-scan type laser radar the center of whose optical axes are coincident with the optical axes of the camera; transforming coordinates of the detected object in conformity with coordinate axes on the display image; and (5) judging whether the detected object is within the lane of the vehicle by comparing the transformed coordinates with the coordinates of the lane.

In the above-mentioned method, first, the axes of the beam-scan type laser radar and the axes of the camera are preliminarily coincided with each other. The camera picks up an image of the road lying ahead of the vehicle, and processes the image signals to detect the vehicle's own lane. The laser radar detects a distance and a direction from the vehicle to the detected object.

The distance and direction represent positional data of the detected object, which are then subject to a coordinate transformation to acknowledge the position on the image picked up by the camera. The coordinates of the detected object after the coordinate transformation are then compared with the coordinates of the vehicle's own lane on the display image picked up by the camera.

If the detected object is within the scope of the coordinates indicating the vehicle's own lane, it is judged that the detected object is within the vehicle's own lane. On the other hand, if the detected object is outside the scope of the coordinates indicating the vehicle's own lane, it is judged that the detected object is not an object within the vehicle's own lane.

The surroundings monitoring apparatus for carrying out the surroundings monitoring method in accordance with the invention comprises: (1) a camera having an optical axis, the camera being mounted on the vehicle for detecting an image of a road; (2) a lane detecting means for detecting coordinates of a lane wherein the vehicle is located by processing image signals output from the camera onto a display image having coordinate axes; (3) a beam-scan type laser radar mounted on the vehicle and installed such that an optical axis center thereof is coincident with the optical axis of the camera; (4) a coordinate transforming means for transforming the coordinates of an object detected by the laser radar in conformity with the coordinate axes of the display image to provide transformed coordinates; and (5) a forward vehicle detecting means for separating objects detected within the lane from objects detected outside the lane by comparing the transformed coordinates with the coordinates of the lane.

In the apparatus of above construction, the image of the road picked up by the camera is processed by the lane detecting means, whereby the vehicle's own lane is detected. The laser radar of the beam-scan type whose optical axes are coincident with that of the camera performs a scan with a laser beam and detects a distance and a direction from the driver's vehicle to the detected object. Such positional information as distance and direction to the detected object is provided to the coordinate transforming means and transformed to positional information of the coordinates on the display image of the camera.

In the forward vehicle detecting means (or separating means), the positional information of the vehicle's own lane indicated in the coordinates of the display image of the camera is compared with the positional information of the detected object. As a result of the comparison, a detected object existing within the vehicle's own lane is separated or distinguished from another detected object not existing within the vehicle's own lane.

In one preferred embodiment, the surroundings monitoring apparatus further comprises a representative coordinate computing means for computing representative coordinates of the objects detected by the laser radar, so that the representative coordinates computed by the representative coordinate computing means are transformed in conformity with coordinate axes on the display image.

Normally, when detecting another vehicle as a detected object, the detection takes place at plural points and not at a single point. Accordingly, it is rather complicated and troublesome to compare all of the plural detected points with the vehicle's own lane on the display image, and moreover the computing speed is reduced. In the preferred embodiment proposed herein, however, all of the plural detected points are integrally treated by a representative point, resulting in simpler computations.

The failure judging method for judging a failure of the surroundings monitoring apparatus caused by misalignment between the laser radar and the camera comprises the steps of: (1) computing representative coordinates of another vehicle detected by the laser radar; (2) transforming the representative coordinates in conformity with coordinate axes of a display image detected by the camera; (3) setting a window for designating a prescribed region on the basis of the transformed representative coordinates of the other vehicle; (4) processing image signals in the window and judging whether or not the optical axes of the camera are coincident with the optical axes of the laser radar depending upon whether the other vehicle is within the window.

The failure judging method is to perform judgment of a failure of the surroundings monitoring apparatus provided with a laser radar and a camera whose optical axes are coincident with each other. First, the other vehicle existing in the vicinity is detected by the laser radar. Then, the place where the other vehicle is picked up on the image of the camera is computed, and a prescribed region of the image which includes the other vehicle is established.

The image of the camera is then processed, and whether or not the optical axis of the camera is coincident with the optical axis of the laser radar is judged depending upon whether or not the vehicle is within the established prescribed region. In other words, if the optical axes of the camera and that of the laser radar are coincident, the detected object picked up by the laser radar must be also picked up by the camera. On the other hand, if the detected object picked up by the laser radar is not picked up by the camera, it may be judged that the optical axes are not coincident.

The failure judgment apparatus for judging a failure of the above-mentioned surroundings monitoring apparatus, to carry out the foregoing failure judging method comprises: (1) a camera having an optical axis, the camera being mounted on the vehicle for picking up an image of a road; (2) a beam-scan type laser radar having an optical axis mounted on the vehicle and installed such that an optical axis center thereof is coincident with the optical axis of the camera; (3) a representative coordinate computing means for computing representative coordinates of another vehicle detected by the laser radar; (4) a coordinate transforming means for transforming the representative coordinates in conformance with coordinate axes on a display image of the camera; (5) a window setting means for setting a window for designating a prescribed region on the basis of the representative coordinates transformed by the coordinate transforming means; (6) an optical axis judging means for judging whether or not the optical axis of the camera is coincident with the optical axis of the laser radar depending upon whether or not the other vehicle is within the window by processing image signals in the window.

The optical axis judging means determines whether the object to be detected is within the window by comparing the transformed representative coordinates with histograms of the detected outline. This function determines whether the optical axes of the camera and the laser beam are coincident.

The optical axis judging means comprises a histogram computing means, a comparative reference value setting means, and a comparing means. The histogram computing means computes histograms representing the horizontal and vertical lines found within the outline. The comparative reference value setting means sets comparative reference values based on the transformed coefficients. The comparing means compares the histograms with the comparative reference values based on the transformed coefficients, and judges that the other vehicle is within the corrected window when the maximum value of the histogram is greater than the comparative reference value for a prescribed period of time.

It is to be noted that in the preferred embodiment proposed herein, the comparative reference value serving as a reference for judging the dimensions of the window set on the display image and for judging whether or not the vehicle exists is corrected corresponding to the distance to the other vehicle detected by the laser radar. Accordingly, even if the distance to the vehicle detected by the laser radar varies, coincidence or non-coincidence between the optical axes of the camera and laser radar is accurately judged.

In another preferred embodiment, the failure judging apparatus further comprises an optical axis judgment inhibiting means. This device inhibits the judgment of coincidence or non-coincidence between the optical axes of the camera and laser radar when the distance indicated by the representative coordinates detected by the laser radar is over a prescribed distance. More specifically, the dimensions of the window and value of the comparative reference are corrected corresponding to the distance to the other vehicle detected by the laser radar. When the distance to the other vehicle is excessively large, the image of the other vehicle on the display of the camera is excessively small, making it difficult to judge whether or not it is an image of another vehicle. Accordingly, the result of coincidence judgment obtained is not always reliable.

Therefore, in the preferred embodiment proposed herein, it is established that the judgment of coincidence of the optical axes is inhibited if the distance to the other vehicle detected by the laser radar is over a prescribed distance.

Other objects, features and advantages of the invention will become apparent in the course of the following description.

BRIEF DESCRIPTION OF THE DRAWINGS

In the detailed description of the preferred embodiment of the present invention presented below, reference is made to the accompanying drawings, in which:

FIGS. 9(a) and 9(b) are explanatory views to explain the operation of the representative coordinates computing means, where

DETAILED DESCRIPTION OF THE PREFERRED EMBODIMENTS

Several preferred embodiments in accordance with the present invention are hereinafter described with reference to the drawings.

The first preferred embodiment proposes a surroundings monitoring method for monitoring the surroundings of a vehicle to judge whether or not an object detected by a beam-scan type laser radar is within a vehicle's own lane, and in addition a surroundings monitoring apparatus to carry out such a method.

The surroundings monitoring method is performed by the following steps.

First, image signals are detected by a camera mounted on a vehicle, directed in the direction of motion of the vehicle. The camera picks up and processes white lines drawn on the road surface ahead of the vehicle. Since the camera is mounted on the vehicle, the camera is within the vehicle's own lane, from which the situation ahead is picked up.

Accordingly, a white line on the left side of the vehicle's own lane comes out on the left side of the image picked up by the camera, while a white line on the right side of the vehicle's own lane comes out on the right side of the image. The white lines are normally drawn on the road so as to be very bright as compared with the road surface.

In the subsequent image processing, points of great brightness on the road are detected, and those points are recognized as a white line. The position of such a white line is indicated on H-V coordinate axes, where the V axis indicates the vertical direction of the image, while the H axis indicates the horizontal direction of the image.

That is, in the H-V coordinate plane, a vehicle's own lane is indicated in a range from a coordinate position of the left white line to a coordinate position of the right white line.

A laser radar mounted on the vehicle, whose optical axis center is coincident with an optical axis of the camera, monitors the surroundings of the vehicle by scanning horizontally with a laser beam. The positional information of a detected object is obtained by an R-θ coordinate system, indicated by a distance to the detected object and an angle θ, representing an angle between the direction of forward travel of the vehicle and the path indicated by the distance.

The positional information of the detected object indicated in the R-θ coordinate system is then transformed to the H-V coordinate system so that it can be compared with the white lines on the display image. The positional information of the detected object transformed to the H-V coordinate system is then compared with the white line positions detected by the camera and indicated in the H-V coordinate system.

Thus, if the comparison of positional information of the object detected by the laser radar and the camera indicates that the object is within the scope of the coordinates indicating the vehicle's own lane, then the detected object is judged to be within the vehicle's own lane. On the other hand, if the comparison of positional information of the object detected by the laser radar and the camera indicates that the object is outside of the scope of the coordinates indicating the vehicle's own lane, then the detected object is judged to be outside of the vehicle's own lane.

The surroundings monitoring apparatus for carrying out the mentioned surroundings monitoring method is described below.

Figure 1:
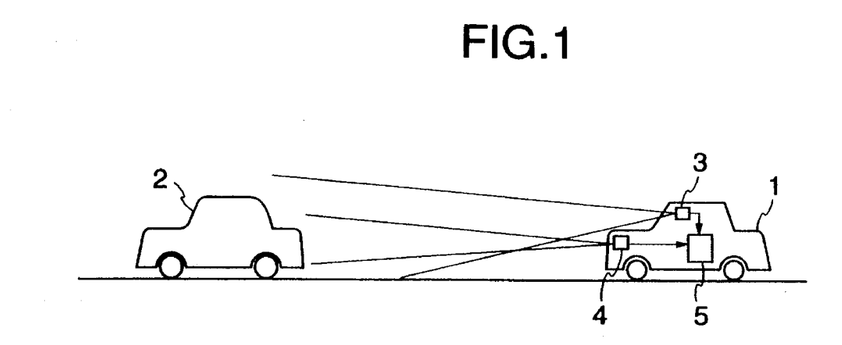
FIG. 1 is an explanatory view showing a vehicle mounted with apparatus proposed by several embodiments of the present invention.

FIG. 1 is an explanatory view showing a vehicle provided with an apparatus in accordance with the first preferred embodiment. In FIG. 1, reference numeral 1 denotes the above-mentioned vehicle, numeral 2 denotes another vehicle, numeral 3 denotes a CCD camera mounted on an upper part of vehicle 1, which is directed in a forward direction, numeral 4 denotes a beam-scan type laser radar mounted on the vehicle 1 whose optical axis is coincident with that of the CCD camera 3, and numeral 5 is a processor for receiving outputs from the CCD camera 3 and the laser radar 4.

Figure 2:
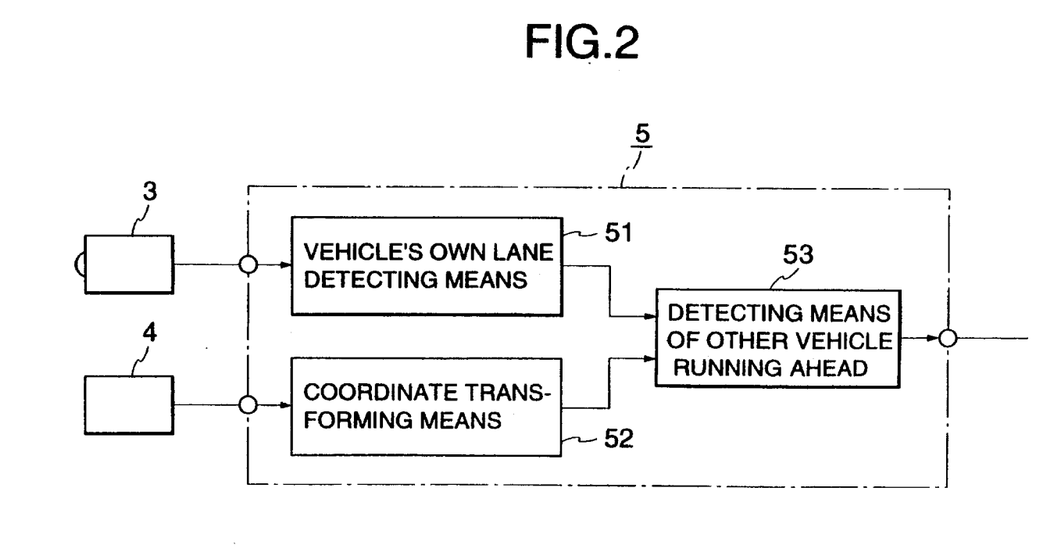
FIG. 2 is a block diagram showing an arrangement of a first preferred embodiment.

FIG. 2 is a block diagram showing the arrangement of the surroundings monitoring apparatus. In FIG. 2, reference numeral 51 denotes the lane detecting means, which is connected to the CCD camera 3 and processes an image picked up by the CCD camera 3 in order to detect a region of the vehicle's own lane.

Numeral 52 denotes a coordinate transforming means connected to the laser radar 4. The coordinate transforming means 52 receives positional information from the other vehicle 2, which is running ahead, and subjects the information detected by the laser radar 4 and represented in the R-θ coordinate system into positional information in the H-V coordinate system. More specifically, the positional information indicated in the R-θ coordinate system represented by a distance from the vehicle 1 and an angle θ (between a reference position and the position of the detected vehicle) is transformed into positional information indicated in the H-V coordinate system corresponding to the image picked up by the CCD camera 3. In this regard, the reference position is in a direction coincident with the optical axis of the CCD camera 3, i.e., in the forward direction of the vehicle 1.

Numeral 53 denotes the forward vehicle detecting means for detecting the vehicle running ahead. The forward vehicle detecting means is connected to the lane detecting means 51 and to the coordinate transforming means 52. The forward vehicle detecting means 53 compares the positional information of the vehicle's own lane, indicated on the H-V coordinate axes and received from the lane detecting means 51, with the information provided by the coordinate transforming means 52, which represents the positional information of the other vehicle 2 running ahead and indicated in H-V coordinates. The forward vehicle detecting means judges whether the vehicle running ahead is in the same lane as the vehicle 1 and outputs a corresponding result.

The forward vehicle detecting means 53 includes separating means for separating or distinguishing between an object detected within the vehicle's own lane and an object detected outside the vehicle's own lane.

Operation of the first preferred embodiment is described below.

Figure 3:
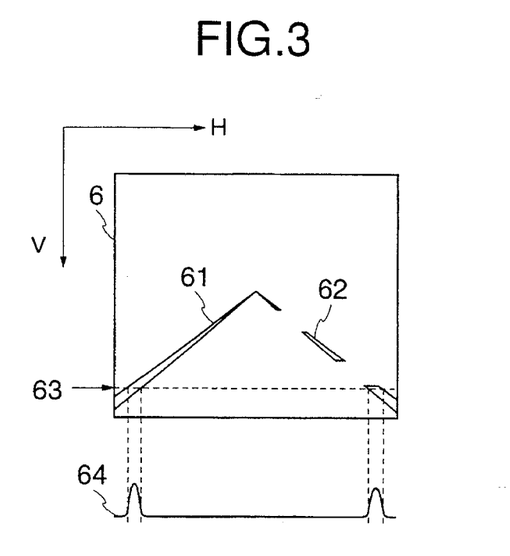
FIG. 3 shows an image of a road lying ahead picked up by a CCD camera mounted on the vehicle.

An image that shows a road surface lying ahead of vehicle 1 is obtained from the CCD camera 3, as shown in FIG. 3. In FIG. 3, reference numeral 6 denotes an image of the road ahead picked up by the CCD camera 3, numeral 61 denotes a left side white line in the image, numeral 62 denotes a right side white line in the image, numeral 63 denotes a prescribed scanning line in the image, and numeral 64 denotes a video signal of the scanning line 63.

Usually, white lines are drawn on a road to show the boundary between the lanes of running traffic. The video signal representation of a white line has the characteristic of a high brightness level as compared with that of the surroundings, as indicated by the video signal 64 in FIG. 3.

Accordingly, any white line may be extracted by detecting a region of high brightness level in comparison with the surroundings. In this manner, the coordinates of the left side white line 61 in the H-V coordinate system and those of the right side white line 62 in the H-V coordinate system are both obtained.

Further, a region from the left side white line 61 to the right side white line 62 is detected as the vehicle's own lane. Such detection of the vehicle's own lane is carried out with respect to the entire image by sequentially renewing the scanning line 63 from the lower side of the image to upper side of the image.

In addition, with respect to a white line having fragmentary portions like the right side white line 62 in the drawing, the positions of the omitted portions are determined by an interpolative computation with reference to the adjacent portions where white lines are drawn.

The positional information of the other vehicle 2 running ahead is obtained from the laser radar 4. As a result, it is possible to compare the positional information of the vehicle's own lane, obtained as described above, with the positional information of the other vehicle 2 running ahead, obtained from the laser radar 4.

Accordingly, it is possible to separate or distinguish between any other vehicle running ahead in the same lane as the detection vehicle and any other vehicle running ahead in a different lane.

However, since the positional information of the other vehicle 2 obtained by the laser radar 4 is given in the form of R-θ coordinates, which are different from the H-V coordinate system of the image 6, it is impossible to compare these positional information items with one another.

This problem is hereinafter described in detail with reference to FIG. 4.

FIGS. 4(a), 4(b) and 4(c) are explanatory views showing the positional information of the vehicle 2 running ahead in respective coordinate systems. FIG. 4(a) shows positional information of vehicle 2 in the R-θ coordinates obtained by the laser radar 4. FIG. 4(b) shows positional information of vehicle 2 and the white lines in H-V coordinates. FIG. 4(c) shows X-Y coordinates establishing the vehicle 1 as an origin, where the longitudinal direction of the vehicle 1 comprises the Y-axis and the horizontal direction comprises the X-axis.

The X-Y coordinates are employed as coordinates for vehicle control. Positional information in terms of R-θ coordinates or H-V coordinates obtained by the laser radar 4 and the CCD camera 3 are utilized after being transformed to positional information in X-Y coordinates.

For example, vehicle control such as the control of distance between cars to observe a proper distance therebetween, as between vehicles 1 and 2, is computed in X-Y coordinates.

As is explicit from FIGS. 4(a), 4(b), and 4(c), the positional information of vehicle 2 is provided by laser radar 4, given in the form of R-θ coordinates indicated by the distance between vehicles 1 and 2 and the angle θ, representing an angle between a path from vehicle 1 to 2 and a reference direction.

On the other hand, the positional information of the left side white line 61 and the right side white line 62 obtained from the image 6 is indicated in the form of H-V coordinates in which the origin is located at top left of the image, the H-axis lies horizontally through the origin, and the V-axis lies vertically through the origin.

Therefore, it is impossible to project the positional information of the laser radar 4 in the form of the R-θ coordinate system onto the image 6 without transformation.

In view of the foregoing, in the first preferred embodiment, the positional information of vehicle 2, running ahead of the detection vehicle, obtained by the laser radar 4 and provided in the form of R-θ coordinates, is first transformed to X-Y coordinates and stored.

The positional information in X-Y coordinates is further transformed to positional information in the form of H-V coordinates, whereby the transformed positional information may be compared with the positional information on the white lines obtained from the image 6 in the form of H-V coordinates.

Thus, in the forward vehicle detecting means 53, the positional information on the white lines obtained from the lane detecting means 51 in the form of H-V coordinates is compared with the positional information of vehicle 2 obtained from the coordinate transforming means 52 in the form of H-V coordinates. Forward vehicle detecting means 52 judges whether or not the positional information of the vehicle 2 is within the scope of vehicle 1's lane, as detected by the own lane detecting means 51. If the ahead-running vehicle 2 is within the scope of the vehicle's own lane, vehicle 2 is judged as being in the vehicle's own lane. On the other hand, if the vehicle 2 is outside the scope of the vehicle's own lane, vehicle 2 is judged as being outside the vehicle's own lane. The result of judgment is then output.

In addition, the positional information of vehicle 2 in the form of X-Y coordinates stored in the coordinate transforming means 52 and the result of judgment of the forward vehicle detecting means 53 are supplied to a vehicle controller (not shown in the figures) to be utilized for vehicular control.

The positional information of white lines on the H-V coordinates obtained from the image 6 is transformed to positional information in X-Y coordinates by the coordinate transforming means (not shown), and supplied to the vehicular controller (not shown) to be utilized for vehicle control.

In this regard, the positional information in the form of R-θ coordinates obtained by the laser radar 4 is transformed to positional information in the form of X-Y coordinates and the transformed information is stored. This is because, when transforming the positional information in the form of X-Y coordinates to positional information in the form of H-V coordinates, to be compared with the positional information on the white lines, and further transformed back to positional information in the form of H-V coordinates to be utilized for vehicular control, the accuracy of the positional information is deteriorated. In particular, large errors may arise from transforming H-V coordinates to X-Y coordinates.

The steps of detecting the forward vehicle by the laser radar 4 and the CCD camera 3 and the manner of coordinate transformation of the detected positional information are hereinafter described more specifically.

Figure 5:
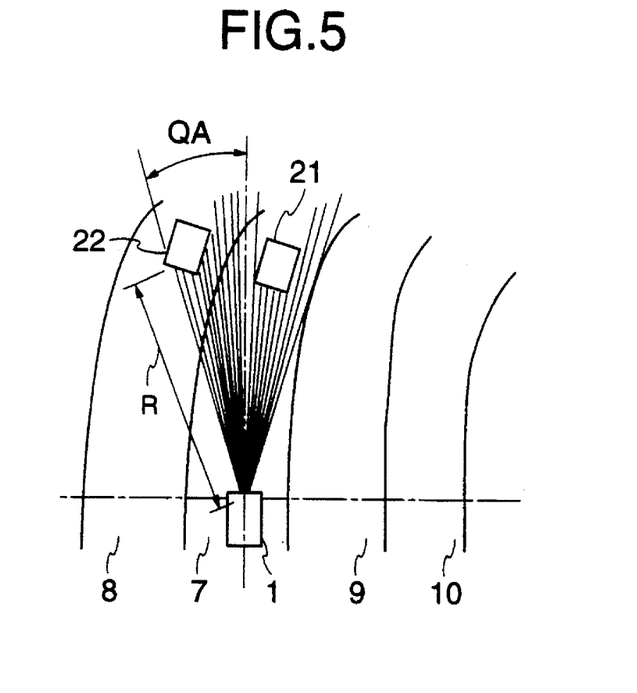
FIG. 5 is an explanatory view showing a manner of detecting a vehicle running ahead by a laser radar mounted on the vehicle.

FIG. 5 is an explanatory view showing a manner of detecting the forward vehicle using the laser radar 4 mounted on the vehicle 1. In the drawing, reference numeral 7 denotes the vehicle's own lane, numeral 8 denotes a lane adjacent to lane 7, numeral 21 denotes a vehicle running ahead in the vehicle's own lane 7, numeral 22 denotes a forward vehicle in the adjacent lane 8, and numerals 9, 10 denote lanes for other vehicles running in the opposite direction.

The laser radar 4 of the beam-scan type mounted on the vehicle 1 performs forward irradiation causing a fine laser beam to scan from a prescribed starting point in the horizontal direction, sequentially from left to right with a specified period and a specified angle increment. At this time, if there is anything reflective (e.g., a rear reflector on a forward vehicle) in the irradiating direction, the laser from is reflected therefrom and returned.

The laser radar 4 receives this reflected light, and the distance to the forward object is detected by measuring the propagation delay time from the irradiation to the receipt of reflected light. A direction θA from the vehicle 1 is detected on the basis of the ordinal number of the specific laser beam reflected, from among those emitted in the sequential scanning operation from the known starting point.

It is to be noted that there are stationary objects such as delineators (reflecting mirrors), signboards, etc. which reflect the laser beam in addition to other vehicles running ahead, and that it is necessary to omit those stationary objects for the purpose of preventing erroneous detection.

For that purpose, the first embodiment utilizes the fact that every stationary object is "carried away" rearward at the same speed as the speed of vehicle 1. In other words, stationary objects appear to have constant speed in a direction opposite to the detection vehicle. Thus, only the positional information a1, a2, b1 and b2 are extracted.

The positional information (R, θA) in R-θ coordinates obtained in the above-mentioned manner is delivered to the coordinate transforming means 52. In the coordinate transforming means 52, the position (R, θA) is transformed to the position (x,y) in X-Y coordinates according to the following transformation expressions.

Figure 4:
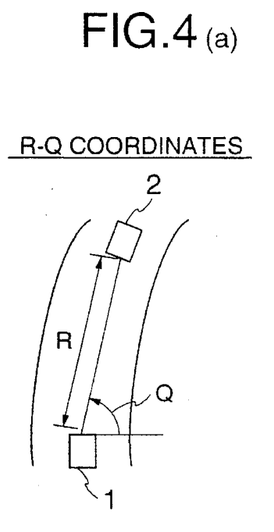
FIGS. 4(a), 4(b) and 4(c) are explanatory views showing positional information of a vehicle running ahead in respective coordinate systems.

Specifically, the transformation expression from the R-θ coordinate system to the X-Y coordinate system is comprised of following expressions (1) and (2) as is obvious from FIG. 4:

$$x = R \cos \theta \qquad (1)$$

$$y = R \sin \theta \qquad (2)$$

Since the angle information θ obtained by the laser radar 4 is an angle from the reference position, the θA is converted to an angle θ indicated in FIG. 4(a) for substitution in the above expressions (1) and (2).

The coordinate transforming means 52 further transforms the transformed position (x, y) to a positional (h, v) in H-V coordinates. A transformation expression for that purpose will be shown below.

Figure 6:
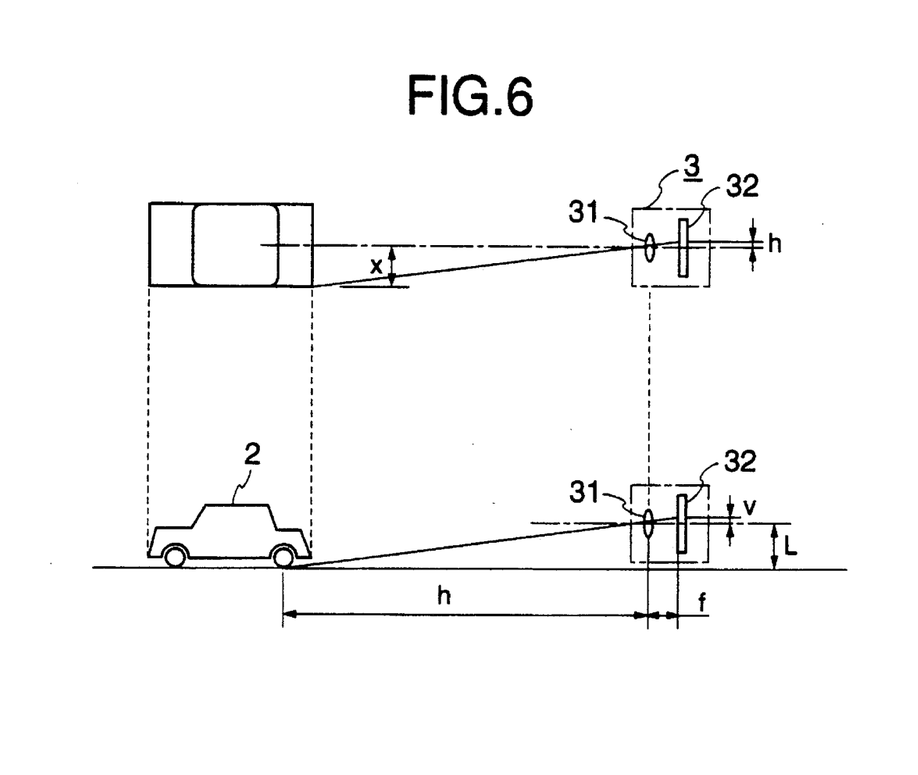
FIG. 6 is an explanatory view showing a manner of detecting a vehicle running ahead by the CCD camera mounted on the vehicle.

FIG. 6 shows an explanatory view showing a relation between the CCD camera 3 and forward vehicle 2, where reference numeral 31 denotes a lens whose focal length is "f", and numeral 32 denotes a CCD image pickup element 32.

When a horizontal image forming position of vehicle 2 on the CCD image pickup element 32 is indicated as a distance "h" from the optical axis center of the CCD, the horizontal position "x" of vehicle 2 is obtained from expression (3) according to the principle of triangulation.

$$h = x \; f/y \quad (3)$$

$$v = f \; L/y \quad (4)$$

Accordingly, when introducing the positional information (x, y) obtained by transforming the positional information (R, θ) of the R-θ coordinates in the above expressions (3) and (4), the positional information (h, v) of vehicle 2 is obtained in H-V coordinates. The positional information of vehicle 2 is then provided from the coordinate transforming means 52 to the forward vehicle detecting means 53.

Figure 7:
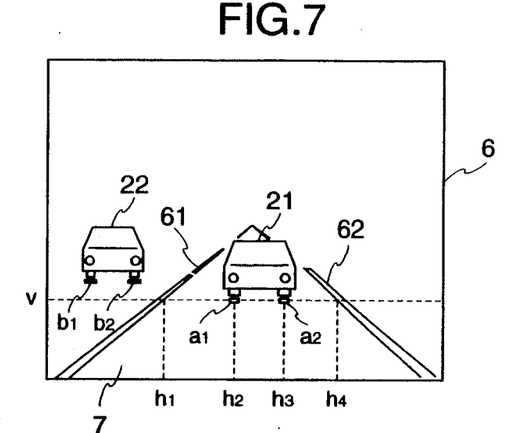
FIG. 7 is an explanatory view showing a manner of transforming positional information of an object detected by the laser radar in conformity with the coordinates on the display image.

FIG. 7 represents an explanatory view showing the operation of the forward vehicle detecting means 53. This drawing shows the manner of superposing a result of detection of the reflectors of forward vehicles 21 and 22 (running ahead of the detect vehicle), detected by the laser radar 4 on the forward image 6 picked up by the CCD camera 3, after transforming the result to H-V coordinates according to the mentioned coordinate transformation.

In FIG. 7, reference numerals a1 and a2 respectively indicate detection results for the vehicle 21 running ahead in the vehicle's own lane, which have been detected by the laser radar 4 and transformed to H-V coordinates, while numerals b1 and b2 respectively indicate detection results of the other vehicle 22 running ahead in the adjacent lane, which have been detected by the laser radar 4 and transformed to H-V coordinates.

Specific steps for detecting vehicle 21, running on the vehicle's own lane, are hereinafter described.

With regard to the detection result a1, when V-coordinate position thereof is "v", white line detection results h1 and h4 on the line "v" are compared with an H-coordinate position h2 of the mentioned detection result a1, and if an inequality of h1<h2<h4 is satisfied thereamong, it is judged that the detection result a1 is within the vehicle's own lane 7.

Likewise, the remaining detection results for points a2, b1 and b2 are subject to similar processing to judge whether these points are within the lane 7.

Thus, if a1 and a2 are within lane 7, then vehicle 21, running ahead of the detection vehicle, is judged to be running ahead in the vehicle's own lane 7. On the other hand, if the detection result is outside lane 7, as for points b1 and b2, the vehicle 22 is judged not to be running ahead in lane 7.

In this manner, it becomes possible to separate the vehicle 21 running ahead within the vehicle's own lane 7 from other vehicles 22 running ahead within adjacent lanes.

It is also possible to recognize the positions of the vehicle 21 and the vehicle 22 from the positional information of the laser radar 4.

It is further possible to perform a more exact vehicle control utilizing the above information for vehicle control.

With respect to the manner of conforming the coordinate systems, there may be a method of transforming R-θ coordinates to H-V coordinates as described above, and another method of transforming H-V coordinates to R-θ coordinates. However, resolving the power of detection results obtained by the CCD camera 3 tends to be less sufficient when the detected object is more distant as compared with the detection results obtained by the laser radar 4, and therefore the transformation from H-V coordinates to R-θ coordinates brings about a very rough and unstable result particularly for a distant area.

In consequence, it is more preferable to employ the method of transforming R-θ coordinates, which is a detection result obtained by the laser radar 4, capable of obtaining a relatively exact detection result even when a detected object is distant, to H-V coordinates obtained by the CCD camera 3.

The second preferred embodiment is described below.

Although the individual detection points a1, a2, b1 and b2 detected by the laser radar 4 are subject to sequential transformation from R-θ coordinates to X-Y coordinates and from X-Y coordinates to H-V coordinates in the foregoing first preferred embodiment, it is also preferable that individual detection points be integrated into one representative point for each vehicle at a stage before performing the coordinate transformation as far as the object to be detected is a single vehicle. In fact, as a result of employing such a step, the number of objects to be processed later is reduced, resulting in quantitative reduction in processing.

Figure 8:
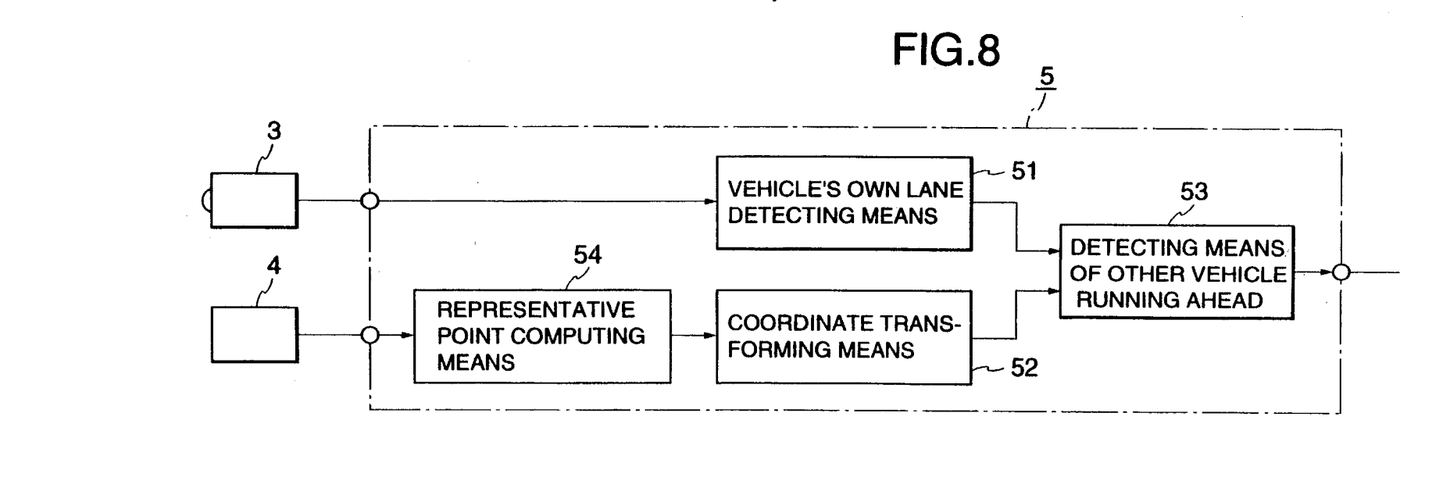
FIG. 8 is a block diagram showing an arrangement of a second preferred embodiment.

FIG. 8 is a block diagram showing an arrangement of the apparatus in accordance with the second preferred embodiment, where reference numeral 54 denotes a representative point computing means for integrally establishing a representative point that represents plural detection points of an object detected by the laser radar 4.

Figure 9A:
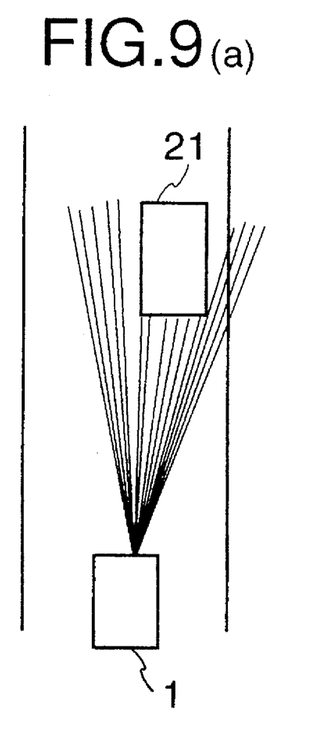
FIG. 9(a) is an explanatory view showing a manner of getting plural positional information using a laser radar from a vehicle running ahead.
Figure 9B:
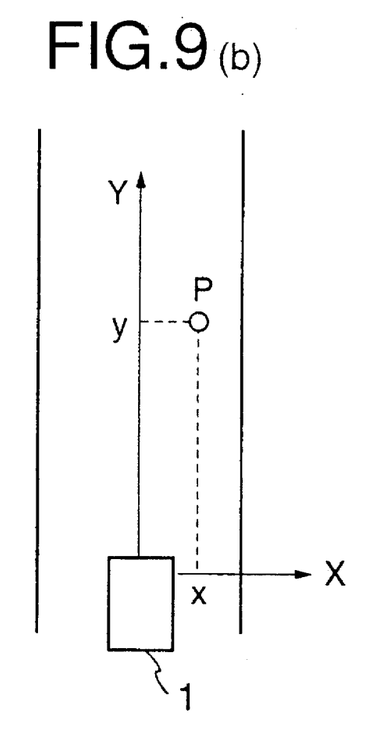
FIG. 9(b) is an explanatory view showing a manner of integrating the plural positional information into one representative point.

FIGS. 9(a) and 9(b) are explanatory views that explain the operation of the representative point computing means 54, where FIG. 9 (a) shows a manner of obtaining plural positional information points of vehicle 21 running ahead in the detecting vehicle's lane by means of the laser radar 4, and where FIG. 9(b) shows a manner of establishing a representative point P which represents the mentioned plural positional information points.

The laser beam emitted from the laser radar 4 is reflected from a reflector, body, etc. of vehicle 21 ahead in the vehicle's lane, whereby plural positional information of the vehicle 21 are obtained. The representative point computing means 54 receives such plural positional information, and first transforms the plural detection points detected in R-θ coordinates to corresponding X-Y coordinates.

Then detection points that are near one another, whose positions on the Y-coordinate are the same, are formed into a group, and a center of gravity position is found. The obtained position of the center of gravity is output as a representative point P representing the detected vehicle, as shown in FIG. 9 (b).

The processing thereafter is the same as in the foregoing first preferred embodiment, with the processing being sequentially performed by the coordinate transforming means 52 and the forward vehicle detecting means 53.

As a result, in the second preferred embodiment, it is possible to reduce the number of computations or to improve the computing speed, in addition to the gaining the advantages of the first preferred embodiment.

Although the position of the center of gravity of the plural detection points is utilized as a representative point in the second preferred embodiment, any other representative point may be utilized, as long as it is positional information representing plural position data obtained from a detected object.

The following discussion relates to the third embodiment, directed to a failure judging method and apparatus for the inventive device.

The failure judging method and apparatus allows for detection of whether the optical axes of the camera and the laser radar are coincident. If the axes are not coincident, then the vehicle running ahead of the detection vehicle cannot be properly detected.

For example, in the foregoing preferred embodiment, the CCD camera 3 and the laser radar 4 are mounted on the vehicle with their optical axes coincident with each other. A problem, however, exists in that if the optical axis of the laser radar 4 is displaced, judgment of whether or not the forward vehicle is within the detecting vehicle's own lane will not be accurately performed.

The third preferred embodiment relates to a detecting method for such displacement of optical axes and to an apparatus for carrying out the method.

Described first are the steps for judging failure of the surrounding monitoring apparatus.

The forward vehicle is detected by the laser radar. As plural detection points are obtained from the vehicle by the laser radar, representative coordinates representing those plural detected points are computed for the sake of simplification of the computation. Then, to recognize the position where the representative coordinates are located on the image of the camera, the representative coordinates are transformed to H-V coordinates having the coordinate axes of the image of the camera.

A window designating a prescribed region is set onto the image on the basis of the transformed representative coordinates of the forward vehicle. If the optical axes of the laser radar and those of the camera are coincident with each other, then the vehicle should be within the mentioned window.

Therefore, image signals in the window are processed to judge whether or not a vehicle is within the window, thereby judging whether or not the optical axes of the camera and the laser radar are coincident with each other.

The apparatus for carrying out the failure detecting method is described below.

Figure 10:
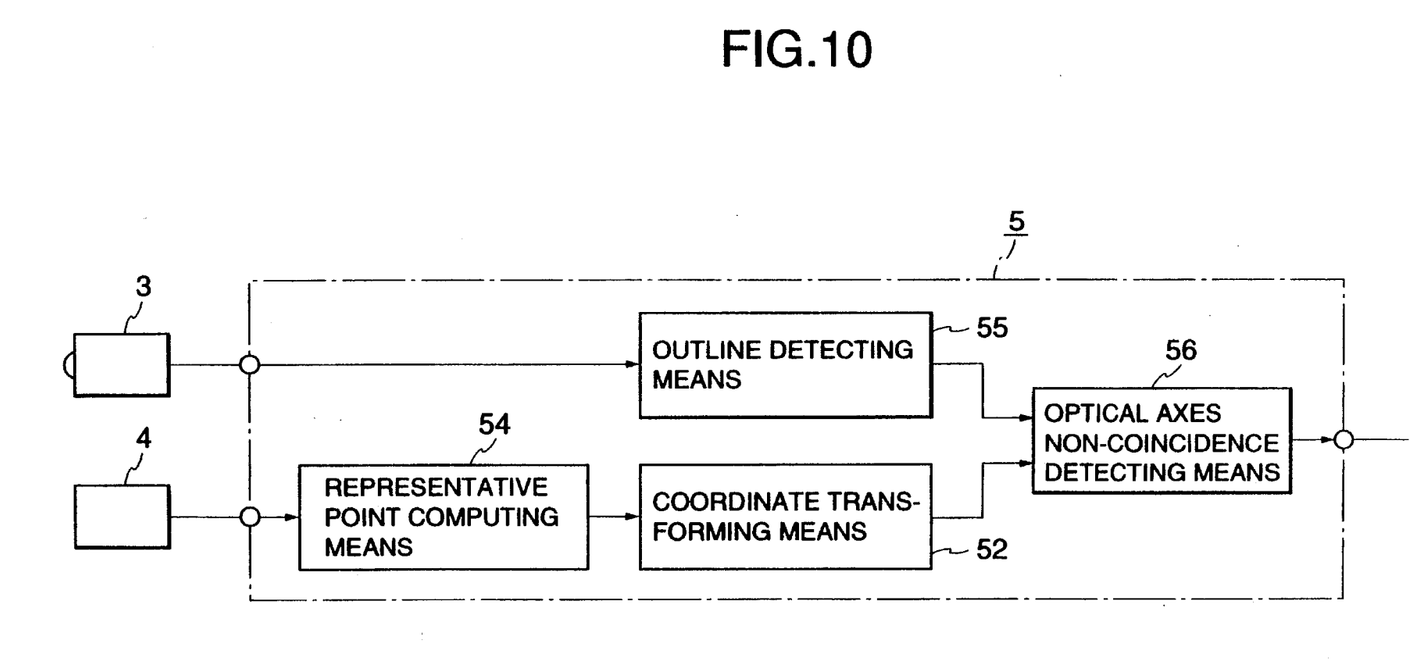
FIG. 10 is a block diagram showing an arrangement of a third preferred embodiment.

FIG. 10 is a block diagram showing an arrangement of the third preferred embodiment. In the figure, reference numeral 55 denotes an outline detecting means connected to the output of the CCD camera 3. The outline detecting means 55 processes the image 6 of the road lying ahead that is picked up by the CCD camera 3 to produce an outline image.

The output of the laser radar 4 is connected to representative point computing means 54 similar to that of the foregoing preferred embodiment.

The output of the representative point computing means 54 is connected to the coordinate transforming means 52 similarly to that of the foregoing preferred embodiment.

Numeral 56 denotes an optical axis non-coincidence detecting means connected to the output of the outline detecting means 55 and to the output of the coordinate transforming means 52.

The optical axis non-coincidence detecting means 56 sets a window onto the outline image obtained by the outline detecting means 55 on the basis of a representative position of the vehicle indicated in H-V coordinates by the coordinate transforming means 52, and judges whether or not the optical axes of the CCD camera 3 and the laser radar 4 are coincident depending upon whether or not the forward vehicle is within the window.

Figure 11:
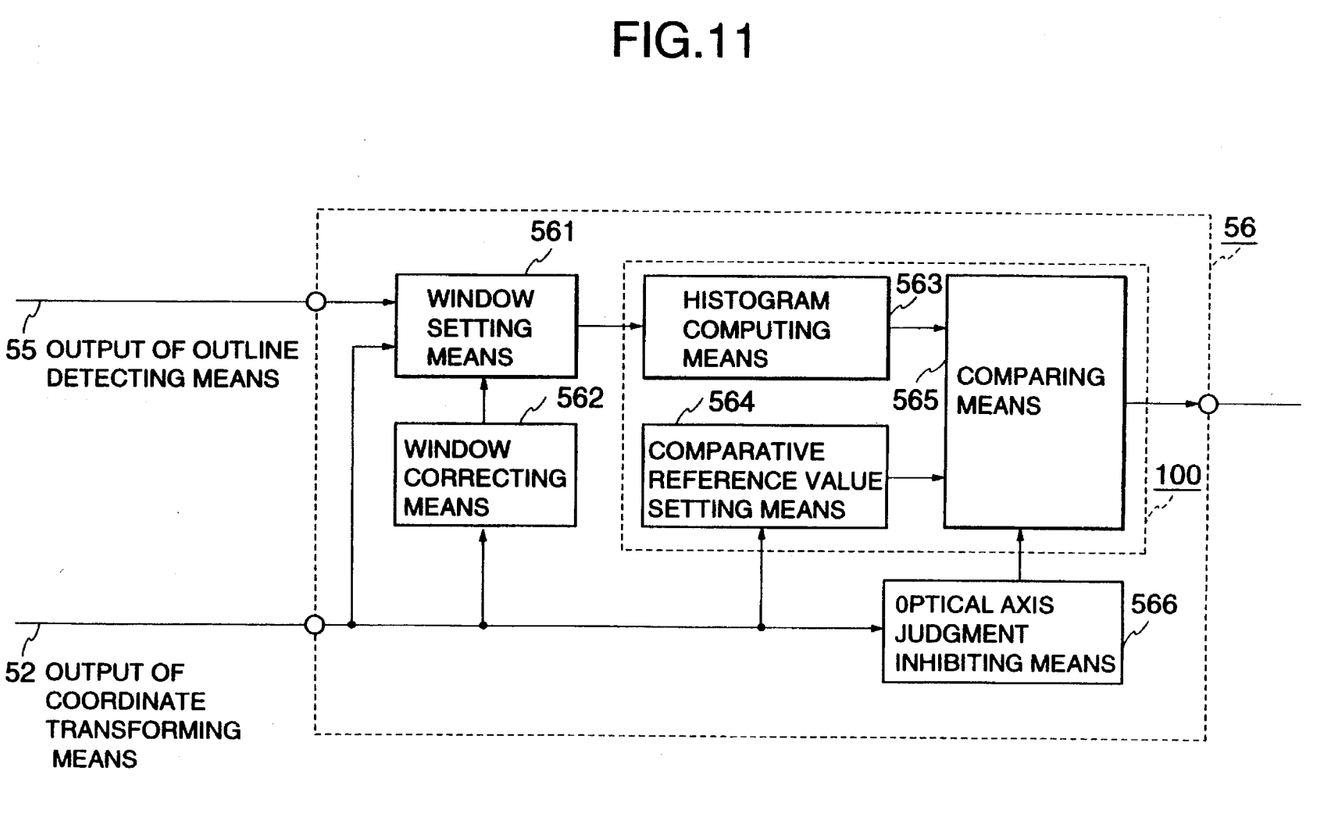
FIG. 11 is a block diagram showing a preferred arrangement of the optical axes non-coincidence detecting means employed in the third preferred embodiment.

FIG. 11 is a block diagram showing details of the optical axis non-coincidence detecting means 56. In the figure, reference numeral 561 denotes a window setting means to which an output of the coordinate transforming means 52 and an output of the outline detecting means 55 are input.

The window setting means 561 sets a window for designating a specific region onto the outline image on the basis of the H-V coordinates of the representative point P, which indicates the forward vehicle 21 and is output from the coordinate transforming means 52.

Numeral 562 denotes a window correcting means to which an output of the coordinate transforming means 52 is input. The output of the window correcting means 562 is supplied to the window setting means 561, for correcting the window region set by the window setting means 561.

Numeral 563 denotes a histogram computing means to which an output of the window setting means is input. The histogram computing 563 computes a histogram of the outline existing in the window corrected by the window correcting means 562.

Numeral 564 denotes a comparative reference value setting means to which an output of the coordinate transforming means 52 is input. The comparative reference value setting means 564 sets a comparative reference value corresponding to the distance to the representative point P obtained from the coordinate transforming means 52.

Numeral 565 denotes a comparing means to which the output of the histogram computing means 563 and that of the comparative reference value setting means are input. The comparing means 565 receives and compares the two outputs. When maximum value of the histogram is greater than the comparative reference value for a prescribed time, it is judged that the forward vehicle is within the window. In this manner, it is judged that the optical axis of the CCD camera 3 is coincident with the optical axis of the laser radar 4. The result of judgment is output to a further processing circuit that is not shown.

The histogram computing means 563, comparative reference value computing means 564 and comparing means 565 form an optical axis judging means 100.

Numeral 566 denotes an optical axis judgment inhibiting means to which an output of the coordinate transforming means 52 is input. The optical axis judgment inhibiting means 566 inhibits the comparing means 565 from judging whether or not the optical axes are coincident when the distance to the representative point P obtained from the coordinate transforming means 52 is greater than a prescribed distance.

Figures 12A, 12B:
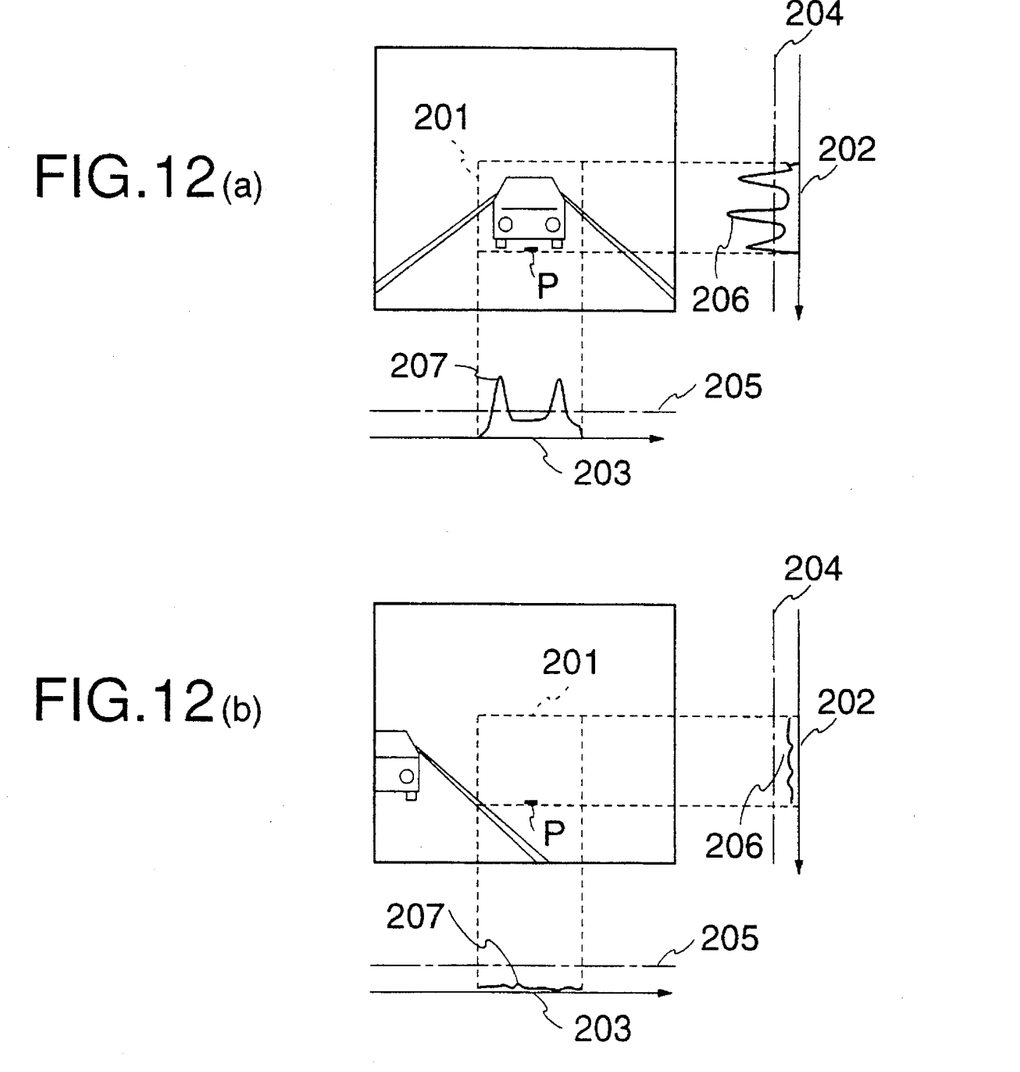
FIGS. 12(a) and 12(b) are explanatory views to explain the operation of the third preferred embodiment.

The operation of the third preferred embodiment is hereinafter described in detail with reference to FIGS. 10 through 12(b). FIGS. 12(a) and 12(b) are explanatory views showing the operation of the third preferred embodiment.

FIG. 12(a) shows the relation between the outline image and position of the forward vehicle detected by the laser radar when the optional axes are coincident. In the figure, reference numeral 201 denotes a window set on the basis of the representative point P, numeral 202 denotes a histogram obtained by integrating the horizontal component of the outline existing in window 201, numeral 203 denotes a histogram obtained by integrating vertical components of the outline shown in window 201, and numerals 204 and 205 denote comparative reference values to be compared with the histograms 202 and 203.

First, the forward vehicle is detected by the laser radar 4. Then, the positional information from plural detected points is input to the representative point computing means 54, and the representative point P representing the plural detection points is computed by the representative point computing means 54 in the same manner as in the foregoing preferred embodiments.

Coordinates of the representative point P are input to the coordinate transforming means 52 and transformed to H-V coordinates in the coordinate transforming means 52.

The transformed coordinates of the representative point P are provided to the window setting means 561. Information relating to a distance between the representative point P and the vehicle 1 is provided from the coordinate transforming means 52, respectively to the window correcting means 562, comparative reference value setting means 564 and optical axis judgment inhibiting means 566.

This distance information may be either a distance, taken before the coordinate transformation has occurred, or a distance "y" on the Y-axis after the coordinate transformation has occurred.

The outline detecting means 55 processes the image picked up by the CCD camera 3 to prepare an outline image by extracting only an outline of the image, and providing the outline to the window setting means 561.

The window setting means 561 receives outputs from the coordinate transforming means 52 and the outline detecting means 55, and sets the window 201 provisionally above the representative point P on the basis of the representative point P as shown in FIGS. 12(a) and 12(b).

The output of the coordinate transforming means 52 is provided to the window correcting means 562, and the window correcting means 562 corrects the dimensions of the region designated by the window 201 set provisionally. More specifically, when the distance is shorter, the region is set be larger, and when the distance is larger, the region is set to be smaller.

In this regard, the window 201 is set above the representative point P, because the representative point P represents the position of the forward vehicle on the road, in accordance with the principles of coordinate transformation.

In the histogram computing means 563, the histograms 202 and 203 are obtained with respect to the window 201 on the basis of the output of the window setting means 561.

The histogram 202 is obtained with respect to the window 201 by integrating the number of picture elements of the outline for each line in the horizontal direction. Likewise, the histogram 203 is obtained by integrating the number of picture elements for each line in the vertical direction.

In this step, it is also preferable to integrate only the number of picture elements adjacent to each other in the same line in order to emphasize levelness or perpendicularity. This emphasis is effective to remove line segments other than for the forward vehicle.

The output of the coordinate transforming means 52 is provided to the comparative reference value setting means 564, and the comparative reference value setting means 564 sets the comparative reference values 204 and 205.

The comparative reference values 204 and 205 are set to be larger when the distance to the representative point P is smaller, and set to be smaller when the distance is larger. This is because when the distance to the representative point P is larger, the image of the forward vehicle picked up by the CCD camera 3 is smaller, resulting in reduction of the outline on the outline image. In this regard, it is not always necessary that the comparative reference values 204 and 205 be equal, and it is also preferable to set the comparative reference value 204 so as to conform to the characteristic of the histogram 202, while setting the comparative reference value 205 so as to conform to the characteristic of the histogram 203.

The comparing means 565 receives the outputs from the histogram computing means 563 and the comparative reference value setting means 564, and judges whether the forward vehicle is within the window 201 when the maximum value of the obtained histogram 202 is greater than the comparative reference value 204 and the maximum value of the histogram 203 is greater than the comparative reference value 205, over a prescribed period of time.

More specifically, referring to FIG. 12(a), the maximum value 206 of the histogram 202 is over the comparative reference value 204 and the maximum value 207 of the histogram 203 is over the comparative reference value 205.

When such a condition continues, the comparing means 565 judges that a vehicle is within the window 201. When the outline image of a vehicle is displayed, many horizontal and vertical components are usually included therein. This is because the external shape of a vehicle shown by an outline image has many horizontal and vertical components. On the other hand, these components do not appear in the image of the road.

Even if some stationary components are picked up, these components flow away rearward at the same speed as the running speed of the vehicle 1 and can thus be discounted as they do not appear consistently over time.

Accordingly, when there are many such horizontal and vertical components included in the outline image in the window displayed in H-V coordinates, it may be judged that a forward vehicle is within the window. On the contrary, when there are few of these components, it may be judged that a forward vehicle is not within the window.

The mentioned prescribed time is useful for judging exactly whether or not a vehicle is within the window 201 and is, therefore, set so as to minimize the influence of noise, etc.

When the comparing means judges that the forward vehicle is within the window 201, it may be considered that the optical axes of the CCD camera 3 and the laser radar 4 are coincident. The result of judgment of coincidence or non-coincidence is utilized in processing performed later for vehicle control, such as control of the distance between vehicles traveling in the same direction.

FIG. 12(b) shows a condition in which either the optical axis of the CCD camera 3 or that of the laser radar 4 is displaced or out of position. In that figure, the optical axis of the laser radar 4 is correctly set, but the optical axes of the CCD camera 3 is displaced rightward, resulting in a leftward displacement of the detected forward vehicle.

In this manner, when the axes of the CCD camera 3 and the laser radar 4 are not coincident, the forward vehicle is picked up outside of the window 201.

When the forward vehicle is detected to be out of position, there are no horizontal or vertical components of the outline of the forward vehicle found in the window 201 and, accordingly, values of the histograms 202 and 203 become small.

As shown in the figure, the maximum value 206 of the histogram 202 is smaller than the comparative reference value 204, and the maximum value of the histogram 203 is smaller than the comparative reference value 205.

As a result, the comparing means 565 judges that there is no vehicle within the window 201, and in such a case it is considered that the axes of the camera 3 and the laser radar 4 are not coincident.

Inhibition of coincidence judgment between the optical axes of the camera and the laser radar is described below.

As described above, when the distance to the representative point P is larger, the image of the forward vehicle picked up by the CCD camera 3 is smaller on the display, and the number of outlines in the window 201 is reduced.

It is possible to compensate such a reduction to a certain extent by setting the comparative reference values 204 and 205 to be smaller. However, when the distance to the representative point P is extremely large, making the image of the other vehicle excessively small, there is almost no difference in number of outlines in the window 201, whether or not there is any vehicle present.

Moreover, when setting the comparative reference values 204 and 205 to be small corresponding to the distance to the representative point P, there arises a greater possibility of erroneous detection of noise.

For these reasons, the range of optical axis judgment is defined in the third preferred embodiment so as to inhibit the comparison by the comparing means when the distance to the representative point P is greater than a prescribed distance.

More specifically, the output of the coordinate transforming means 52 is provided to the optical axis judgment inhibiting means 566, and when the distance to the representative point P is greater than a prescribed distance, a comparison inhibiting signal is provided to the comparing means 565, in order to inhibit the judgment of coincidence or non-coincidence of the axes of the CCD camera 3 and the laser radar 4.

The prescribed distance mentioned above is set to a distance at which dimensions of the forward vehicle image picked up by the CCD camera 3 are still sufficiently large, and within such a distance the number of outlines in the window 201 is sufficiently different depending upon the existence or non-existence of forward vehicle.

The mentioned comparative reference values 204 and 205 are respectively set to a large enough value so as not to judge erroneously the existence or non-existence of the forward vehicle in the presence of noise.

The mentioned prescribed distance is generally somewhat less than one hundred meters.

As described above, in the third preferred embodiment, it is possible to judge whether or not the optical axis of the CCD camera 3 is coincident with that of the laser radar 4.

Furthermore, since the window 201 is formed in the outline image, the histograms 202 and 203 are processed simply in a shorter time.

Since dimensions of the window 201 are corrected according to the distance to the representative point P, there is almost no outline for which the existence or non-existence of a forward vehicle in the window 201 can be erroneously judged.

Since the comparative reference values 204 and 205 are corrected according to the distance to the representative point P, the existence or non-existence of forward vehicle in the window can be accurately judged.

Since judgment on whether or not the optical axes of the CCD camera 3 are coincident with that of the laser radar 4 when the distance to the representative point P is over a prescribed distance is inhibited, there is no erroneous judgment regarding whether or not the optical axes are coincident.

In addition, it is to be understood that the scope of the third preferred embodiment is not limited to the specific embodiment described above, but can apply to any other surrounding monitoring apparatus which can judge displacement of optical axes.

Many modifications and variations of the present invention may be made without departing from the spirit and scope of the invention. The scope of the invention, therefore, is not limited to the foregoing specific preferred embodiments but is to be determined solely by the appended claims.

What is claimed:

1. A surroundings monitoring apparatus for monitoring the surroundings of a vehicle comprising:

a camera having an optical axis, said camera being mounted on said vehicle for detecting an image of a road;

a lane detecting means for detecting coordinates of a lane wherein said vehicle is located by processing image signals output from said camera onto a display image having coordinate axes;

a beam-scan type laser radar mounted on said vehicle and installed such that an optical axis center thereof is coincident with the optical axis of said camera;

a coordinate transforming means for transforming the coordinates of an object detected by said laser radar in conformity with the coordinate axes of said display image to provide transformed coordinates; and a forward vehicle detecting means for separating objects detected within said lane from objects detected outside said lane by comparing said transformed coordinates with the coordinates of said lane.

2. A surroundings monitoring apparatus in accordance with claim 1, wherein said lane detecting means determines boundaries of said lane by distinguishing the white lines of said lane from the surroundings and further uses interpolative computations to determine said boundaries if said white lines are not continuous.

3. A surroundings monitoring apparatus in accordance with claim 1, wherein said forward vehicle detecting means distinguishes between vehicles located within said lane and vehicles located outside said lane.

4. A surroundings monitoring apparatus in accordance with claim 3, wherein said forward vehicle detecting means distinguishes between vehicles located within said lane and vehicles located outside said lane by comparing the horizontal locations of the reflections from said vehicles to the horizontal locations of respective points of said lanes along a vertical line.

5. A surroundings monitoring apparatus in accordance with claim 1, further comprising:

a representative coordinate computing means for computing representative coordinates of an object detected by the laser radar, said representative coordinates being transformed in conformity with said coordinate axes on said display image.

6. A surroundings monitoring apparatus in accordance with claim 5, wherein said representative coordinates represent a center of gravity of said object.

7. A failure judgment apparatus for judging a failure of a surroundings monitoring apparatus comprising:

a camera having an optical axis, said camera being mounted on a vehicle for picking up an image of a road;

a beam-scan type laser radar having an optical axis mounted on said vehicle and installed such that an optical axis center thereof is coincident with the optical axis of said camera;

a representative coordinate computing means for computing representative coordinates of other vehicle detected by said laser radar;

a coordinate transforming means for transforming said representative coordinates in conformance with coordinate axes on a display image of said camera;

a window setting means for setting a window for designating a prescribed region on the basis of said representative coordinates transformed by said coordinate transforming means;

an optical axis judging means for judging whether or not the optical axis of said camera is coincident with the optical axis of said laser radar depending upon whether or not the other vehicle is within said window by processing image signals in said window.

8. A failure judgment apparatus for judging a failure of a surroundings monitoring apparatus in accordance with claim 7, further comprising:

a window correcting means for correcting dimensions of the prescribed region designated by the window corresponding to a distance indicated by the representative coordinates of the other vehicle detected by the laser radar, wherein said optical axis judging means comprises:

a histogram computing means for computing a histogram of an outline existing in the corrected window;

a comparative reference value setting means for setting a comparative reference value to be compared with said histogram corresponding to said distance; and a comparing means for comparing said histogram with said comparative reference value and judging that the other vehicle is within said corrected window when a maximum value of said histogram is greater than the comparative reference value for a prescribed time.

9. A failure judgment apparatus for judging a failure of a surroundings monitoring apparatus in accordance with claim 4, further comprising:

an optical axis judgment inhibiting means for inhibiting the judgment of coincidence or non-coincidence between the optical axis of the camera and the optical axis of the laser radar when the distance indicated by the representative coordinates detected by the laser radar is greater than a prescribed distance.

10. A surroundings monitoring method for monitoring surroundings of a vehicle, comprising the steps of:

detecting image signals of a lane in which said vehicle is located with a camera mounted on said vehicle;

determining coordinates of said lane on a display image by processing said image signals;

detecting an object ahead of said vehicle with a beam-scan type laser radar the center of whose optical axes are coincident with the optical axes of said camera;

transforming coordinates of said detected object in conformity with coordinate axes on said display image; and judging whether said detected object is within the lane of said vehicle by comparing said transformed coordinates with said coordinates of said lane.

11. A failure judging method for judging a failure of a surroundings monitoring apparatus, said apparatus being provided with a camera mounted on a vehicle for picking up an image of a road and a beam-scan type laser radar mounted on said vehicle and installed such that an optical axis center thereof is coincident with an optical axis of said camera, comprising the steps of:

computing representative coordinates of another vehicle detected by said laser radar:

transforming said representative coordinates in conformity with coordinate axes of a display image detected by said camera;

setting a window for designating a prescribed region on the basis of said transformed representative coordinates of said other vehicle;

processing image signals in said window and judging whether or not the optical axes of said camera are coincident with the optical axes of said laser radar depending upon whether said other vehicle is within said window.

* * * * *